UNITED STATES PATENT OFFICE.

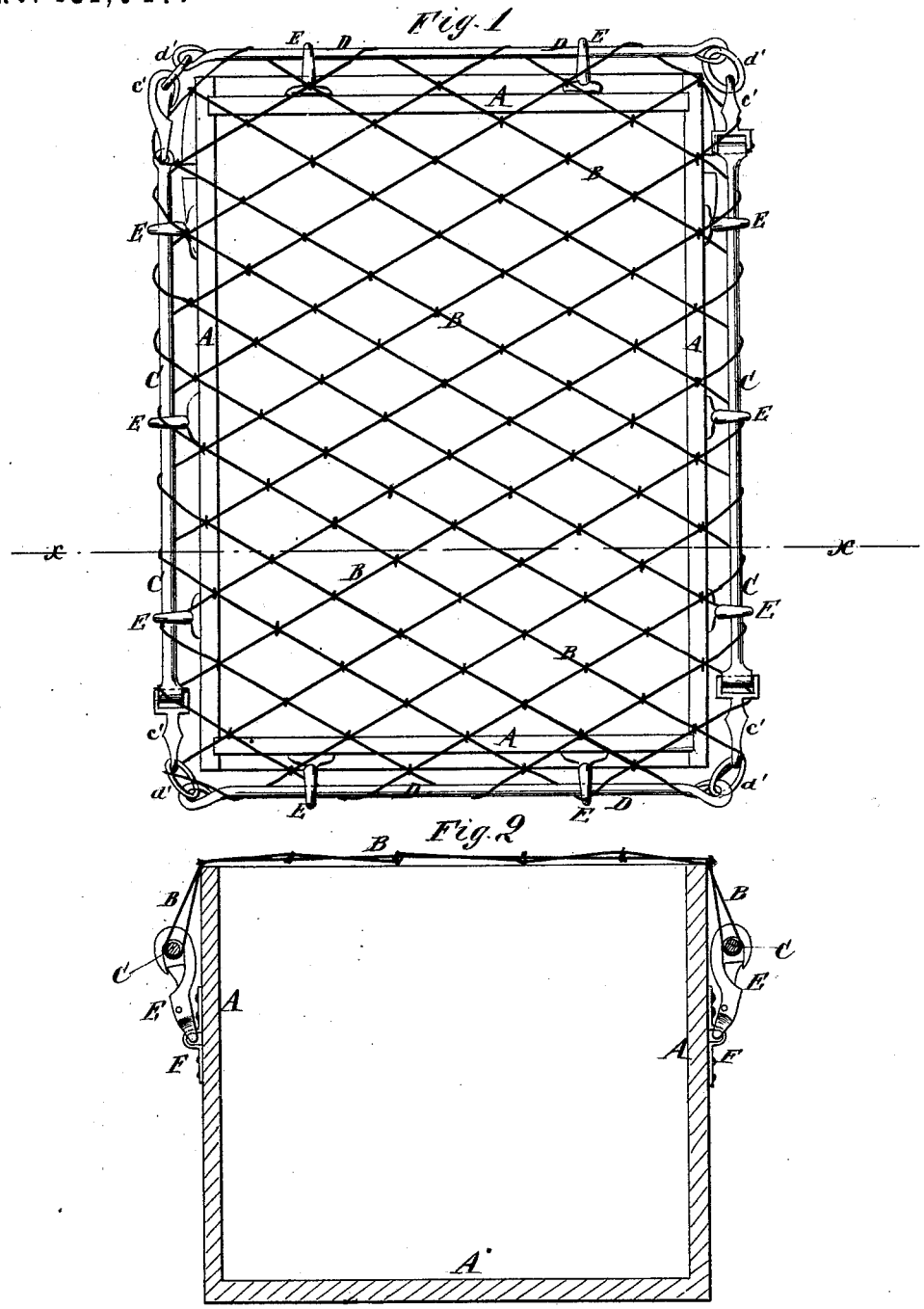

CHARLES CREMER, OF RED BLUFF, CALIFORNIA.

IMPROVEMENT IN WAGON-COVERS.

Specification forming part of Letters Patent No. 181,047, dated August 15, 1876; application filed June 12, 1876.

*To all whom it may concern:*

Be it known that I, CHARLES CREMER, of Red Bluff, Tehama county, California, have invented a new and Improved Ventilated Wagon-Cover, of which the following is a specification:

Figure 1 is a top view of a wagon-box to which my improved cover has been applied; and Fig. 2 is a vertical cross-section of the same, taken through line $x\ x$, Fig. 1.

Similar letters of reference indicate corresponding parts.

The object of this invention is to furnish an improved cover for the boxes of wagons, cars, and other vehicles for transporting swine, calves, sheep, fowls, &c., which shall be so constructed as to allow the air to have free passage to the animals while confining them securely.

The invention consists in the combination of the net, the four rods, the connecting snap-hooks and rings, and the holding snap-hooks, with the body or box of a wagon, car, or other vehicle, as hereinafter fully described.

A represents the body or box of a wagon, car, or other vehicle. B represents a net of such a size as to cover the box A, and overlap its sides and ends. Through the meshes of the sides and ends of the net B are passed the rods C D. The end rods D have rings $d'$ attached to their ends to receive the snap-hooks $c'$ attached to the ends of the side rods C, thus forming a frame upon which net B is stretched. E are snap-hooks, secured to the sides and ends of the box A by keepers F, to receive the rods C D, and hold them securely.

By this construction the animals will be securely confined, and at the same time will have the benefit of a free circulation of air. By this construction, also, by unhooking the ends of the rear rod D and withdrawing it from the meshes of the net B, the rear end-board of the box A may be removed to allow some of the animals to be taken out or others put in, while guarding against the escape of any.

Having thus described my invention, I claim as new and desire to secure by Letters Patent—

The combination of the net B, the rods C D, the connecting snap-hooks $c'$, and rings $d'$, and the holding snap-hooks E, with the body or box A of a wagon, car, or other vehicle, substantially as herein shown and described.

CHARLES CREMER.

Witnesses:
W. H. BAHNEY,
C. T. ALVORD.